US007388960B2

(12) United States Patent
Kuo et al.

(10) Patent No.: US 7,388,960 B2
(45) Date of Patent: Jun. 17, 2008

(54) MULTIMEDIA SPEAKER HEADPHONE

(76) Inventors: Ching-Chang Kuo, No. 8, Lane 37, Ming Chwan Rd., Gu Shan Dist., Kaohsiung (TW); Chang-Ning Hung, No. 36-3, Lane 28, Hsinkuang Rd., Linya Dist., Kaohsiung (TW)

( * ) Notice: Subject to any disclaimer, the term of this patent is extended or adjusted under 35 U.S.C. 154(b) by 467 days.

(21) Appl. No.: 11/037,010

(22) Filed: Jan. 19, 2005

(65) Prior Publication Data

US 2006/0159279 A1 Jul. 20, 2006

(51) Int. Cl.

| | |
|---|---|
| ***H04R 25/00*** | (2006.01) |
| ***H04R 1/02*** | (2006.01) |
| ***H04Q 11/02*** | (2006.01) |
| ***H04J 3/26*** | (2006.01) |
| ***H04L 12/40*** | (2006.01) |

(52) U.S. Cl. ........................ 381/186; 381/74; 381/371; 381/374; 381/384; 381/386; 379/430; 379/432; 379/440

(58) Field of Classification Search ................ 381/366, 381/365, 367, 182, 370, 371, 373–375, 376, 381/384, 186, 390, 391, 394, 395, 74; 379/430, 379/420.02–420.04, 428.02, 428.04, 433.02, 379/433.03

See application file for complete search history.

(56) References Cited

U.S. PATENT DOCUMENTS

| | | | | |
|---|---|---|---|---|
| 4,634,816 | A * | 1/1987 | O'Malley et al. ........... | 379/430 |
| 5,099,514 | A * | 3/1992 | Acree .......................... | 379/441 |
| 6,333,982 | B1 * | 12/2001 | Sapiejewski et al. ....... | 379/430 |
| 6,466,681 | B1 * | 10/2002 | Siska et al. ................. | 381/372 |
| 6,731,771 | B2 * | 5/2004 | Cottrell ...................... | 381/371 |
| 6,748,095 | B1 * | 6/2004 | Goss .......................... | 381/374 |
| 7,242,765 | B2 * | 7/2007 | Hairston ..................... | 379/419 |

* cited by examiner

*Primary Examiner*—Wayne Young
*Assistant Examiner*—Dionne H Pendleton
(74) *Attorney, Agent, or Firm*—Bacon & Thomas, PLLC

(57) ABSTRACT

A multimedia speaker headphone has a headband, two ear-covers and a control and transmission device. The ear-covers are mounted pivotally on the headband and each ear-cover has an earphone speaker and an audio speaker. The control and transmission device has a controller and a transmission apparatus. The controller is connected one of the ear-covers and has a switch to selectively switch on the earphone speakers or the audio speakers. The transmission device has at least one transmission cord having a terminal. The earphone speakers and audio speakers allow a user to listen to music with or without wearing of the multimedia speaker headphone.

7 Claims, 7 Drawing Sheets

MULTIMEDIA SPEAKER HEADPHONE

BACKGROUND OF THE INVENTION

1. Field of the Invention

The present invention relates to a headphone, and more particularly to a multimedia speaker headphone that has earphone speakers and speakers allowing a user to listen to music with or without wearing the multimedia speaker headphone.

2. Description of Related Art

A conventional headphone comprises a headband having two ends and two ear-covers mounted respectively on the ends of the headband. Each ear-cover has an earphone mounted inside the ear-cover. The headphone is used with a stereo system or computer to broadcast the music or sounds. The headband is worn on a person's head with the ear-covers fitted over the ears to allow the person to listen to the music in privacy, that is people nearby are not bothered by the music. This is particularly true when the listener wants to enjoy the music at a loud level. However, after a certain amount of time listening via the headphones, the user will feel discomfort and fatigue from the ear covers. Some persons may carry with them simultaneously the headphone and a speaker so they can use the speaker when getting tired after wearing the headphone for a while. However, the speaker is large and inconvenient for the person to carry.

To overcome the shortcomings, the present invention provides a multimedia speaker headphone to mitigate or obviate the aforementioned problems.

SUMMARY OF THE INVENTION

The main objective of the invention is to provide a multimedia speaker headphone that has earphone speakers and audio speakers allowing a user to listen to music with or without wearing of the multimedia speaker headphone.

A multimedia speaker headphone has a headband, two ear-covers and a control and transmission device.

The ear-covers are mounted pivotally on the headband and each has an earphone speaker and an audio speaker.

The control and transmission device has a controller and a transmission apparatus. The controller is connected one of the ear-covers and has a switch to selectively switch on the earphone speakers or the audio speakers. The transmission device has at least one transmission cord having a terminal.

Other objectives, advantages and novel features of the invention will become more apparent from the following detailed description when taken in conjunction with the accompanying drawings.

DETAILED DESCRIPTION OF PREFERRED EMBODIMENT

Figure 1:
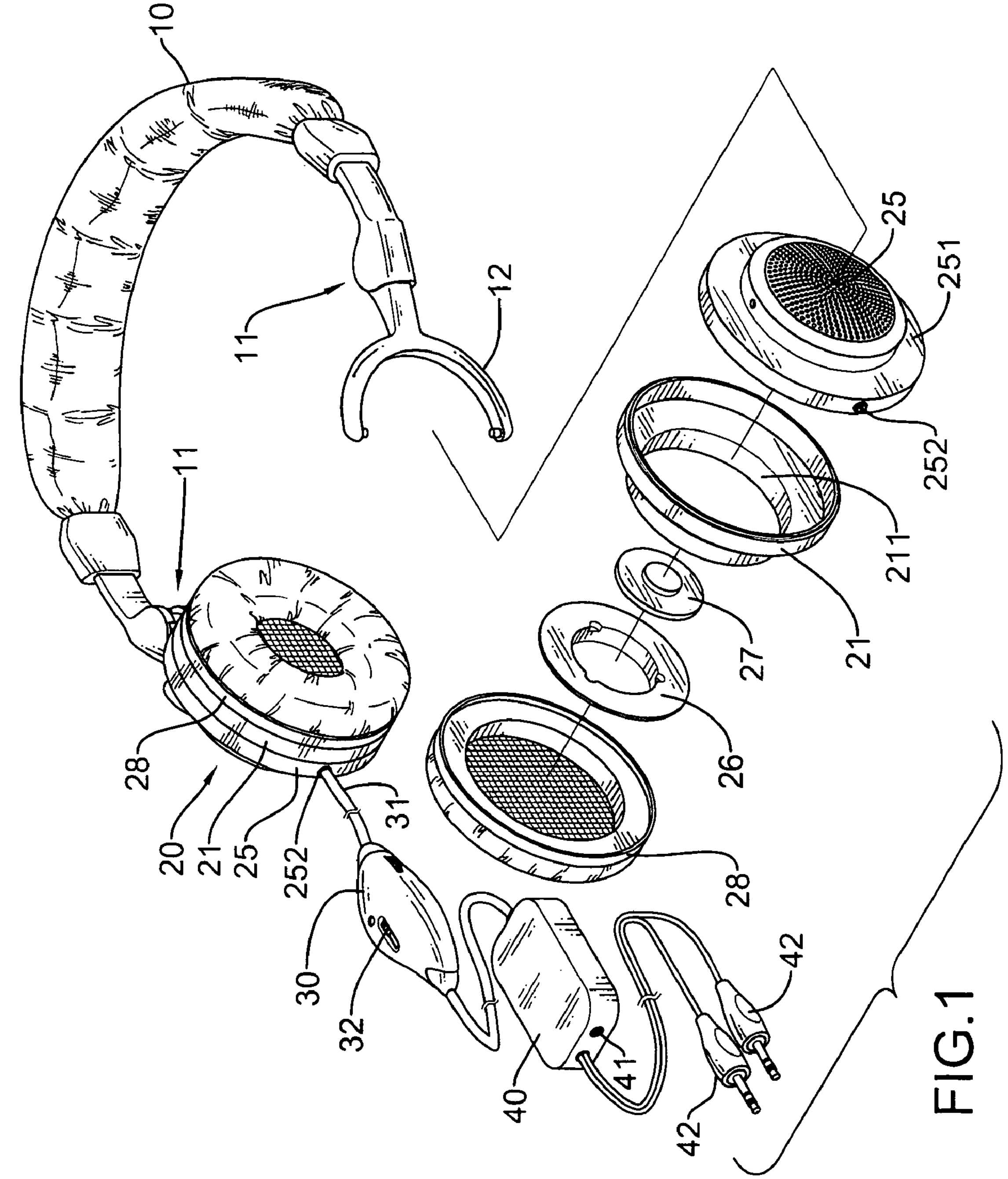
FIG. 1 is an exploded perspective view of a multimedia speaker headphone in accordance with the present invention.
Figure 2:
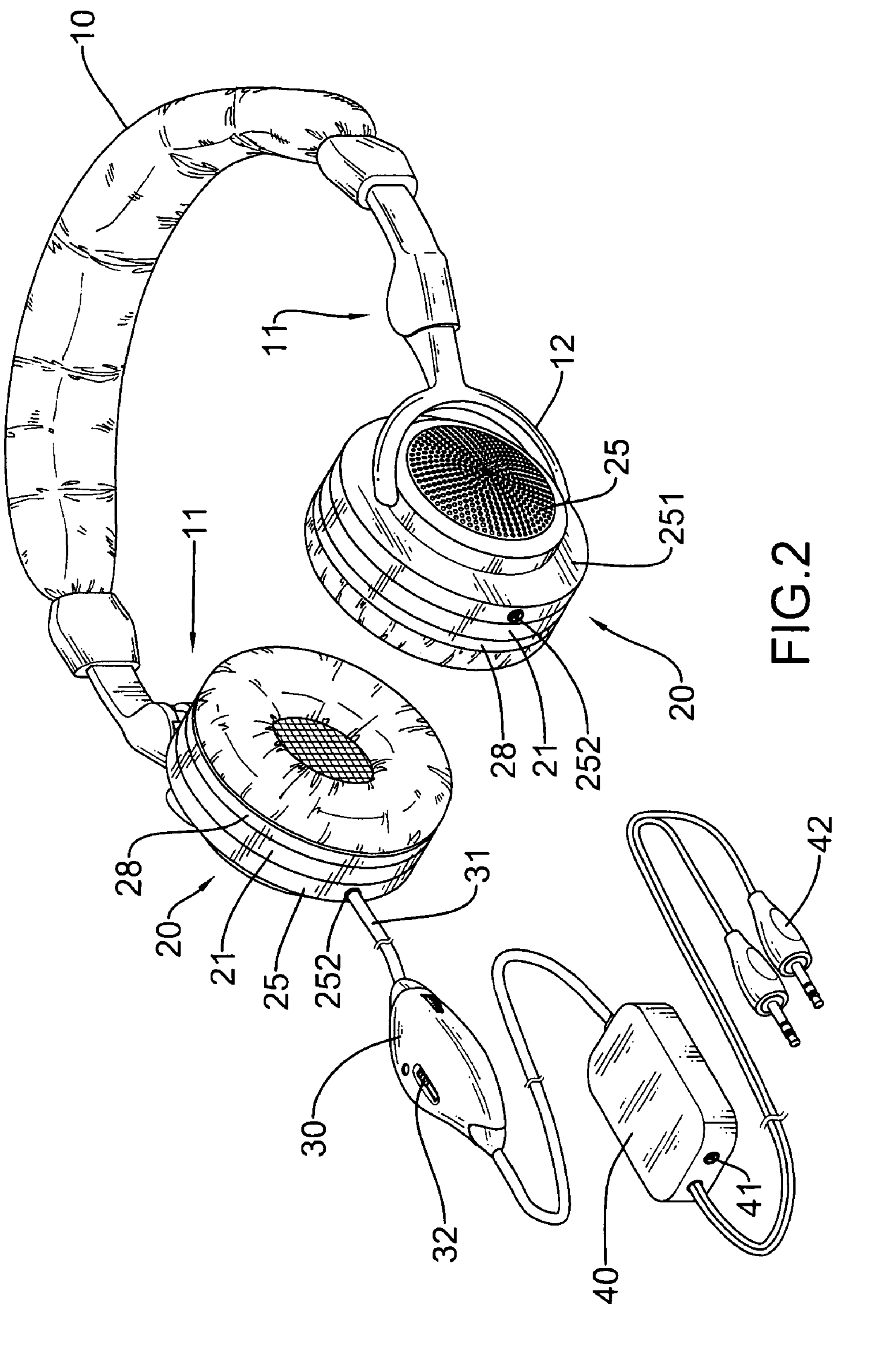
FIG. 2 is a perspective view of the multimedia speaker headphone in FIG. 1.

With reference to FIGS. 1 and 2, a first embodiment of a multimedia speaker headphone in accordance with the present invention comprises a headband (10), two ear-covers (20) and a control and transmission device.

The headband (10) has two joint ends (11) and two cover mounts (12). The cover mounts (12) are semi-circular, are mounted pivotally and respectively at the joint ends (11) and each cover mount (12) has two ends.

The ear-covers (20) are mounted pivotally and respectively between the ends of the cover mounts (12) of the headband (10) and are connected electrically to each other. Each ear-cover (20) has a casing (21), an audio speaker (25), a retainer (26), an earphone speaker (27) and a cover (28).

The casing (21) is annular and hollow and has an inside open end and an outside open end and an inner surface (211). The audio speaker (25) is mounted on the outside open end of the casing (21) and has a housing (251) and a first socket (252) defined in the housing (251). The retainer (26) is mounted on the inner surface (211) of the casing (21). The earphone speaker (27) is mounted on the retainer (26) in the casing (21). The cover (28) is mounted on the inside open end of the casing (21) opposite to the audio speaker (25) and has an inside surface and a soft pad. The soft pad is mounted on the inside surface of the cover (28).

The control and transmission device is connected electrically to one of the ear-covers (20) and has a controller (30) and a transmission apparatus (40).

Figure 7:
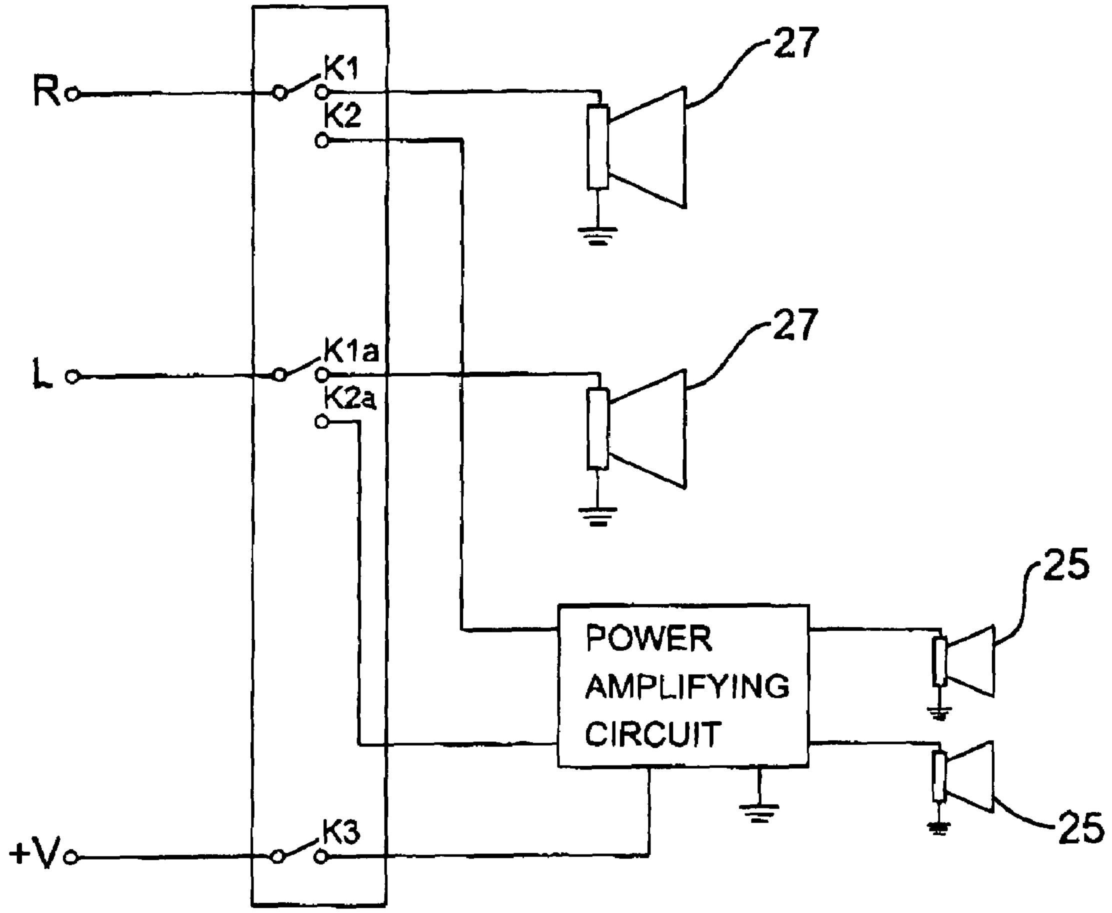
FIG. 7 is a block diagram of the earphone speakers and the audio speakers of the multimedia speaker headphone in FIG. 2.

With further reference to FIG. 7, the controller (30) is connected electrically to one of the ear-covers (20) and has a cord (31) and a switch (32). The cord (31) is mounted on the controller (30) and has a connecting end detachably mounted in the first socket (252) of the audio speaker (25). The switch (32) is mounted movably on the controller (30) and is connected electrically to the earphone speakers (27) and the audio speakers (25). The switch (32) selectively switches on the earphone speakers (27) or the audio speakers (25). The switch (32) moves to electrically connect a pair of first wires relative to the earphone speakers (27) at contacts (K1, K1*a*) respectively on the first wires so the earphone speakers (27) switch on. Alternatively, the switch (32) moves to electrically connect a pair of second wires relative to the audio speakers (25) at contacts (K2, K2*a*) respectively on the second wires so the audio speakers (25) switch on. The second wires connect a power amplifying circuit to the audio speakers (27).

The transmission apparatus (40) is connected electrically to the controller (30) and has at least one transmission cord and a second socket (41). The at least one transmission cord is mounted to the transmission apparatus (40) and has distal end and a terminal (42) mounted on the distal end. The second socket (41) is defined in the transmission apparatus (40).

Figure 3:
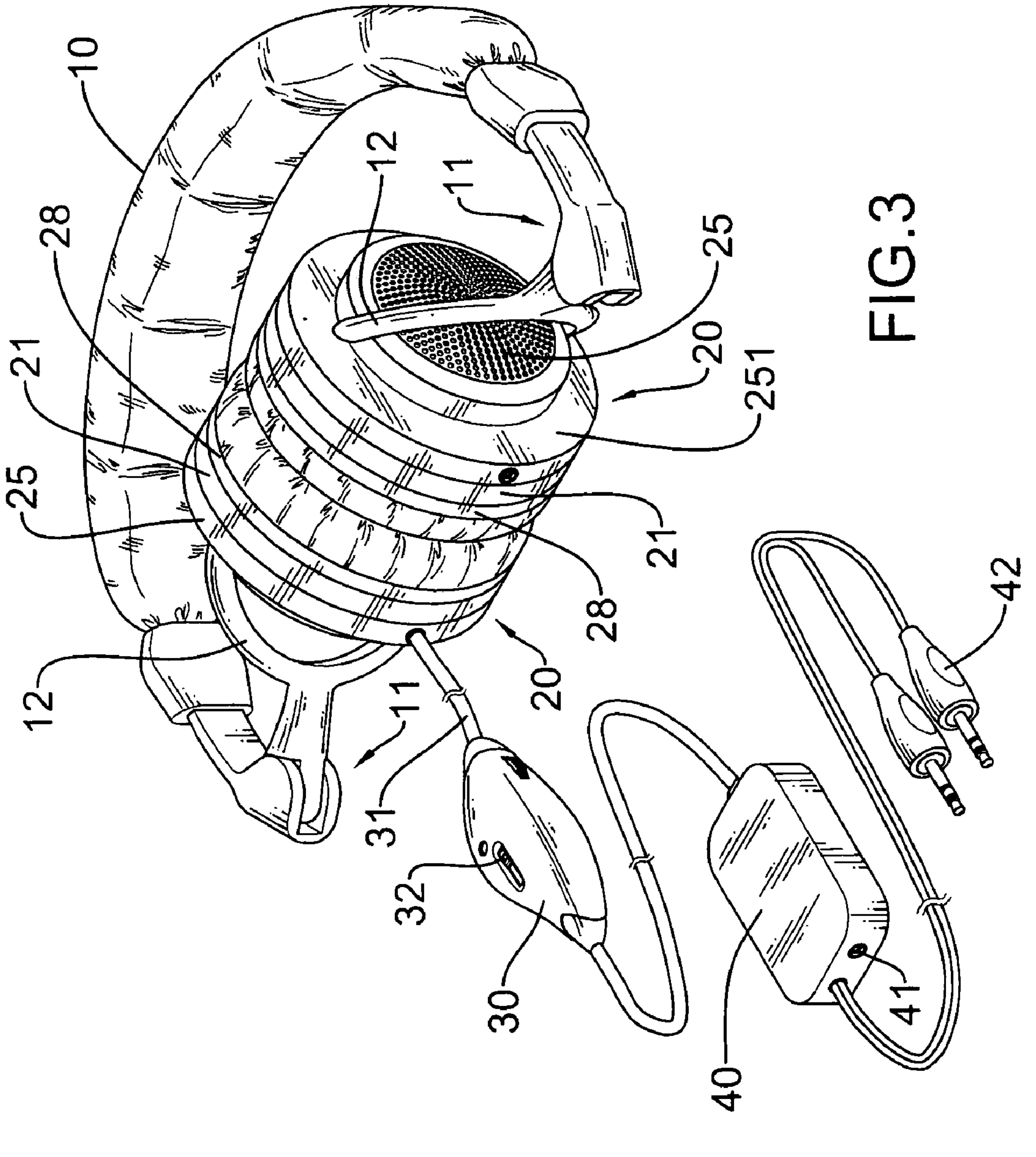
FIG. 3 is an operational view of the multimedia speaker headphone in FIG. 2.

With reference to FIG. 3, the cover mounts (12) on the headband (10) pivot toward each other and the ear-covers (20) pivot to let the soft pads abut each other. Therefore, the arrangement of the multimedia speaker headphone becomes especially compact for storage.

Figure 4:
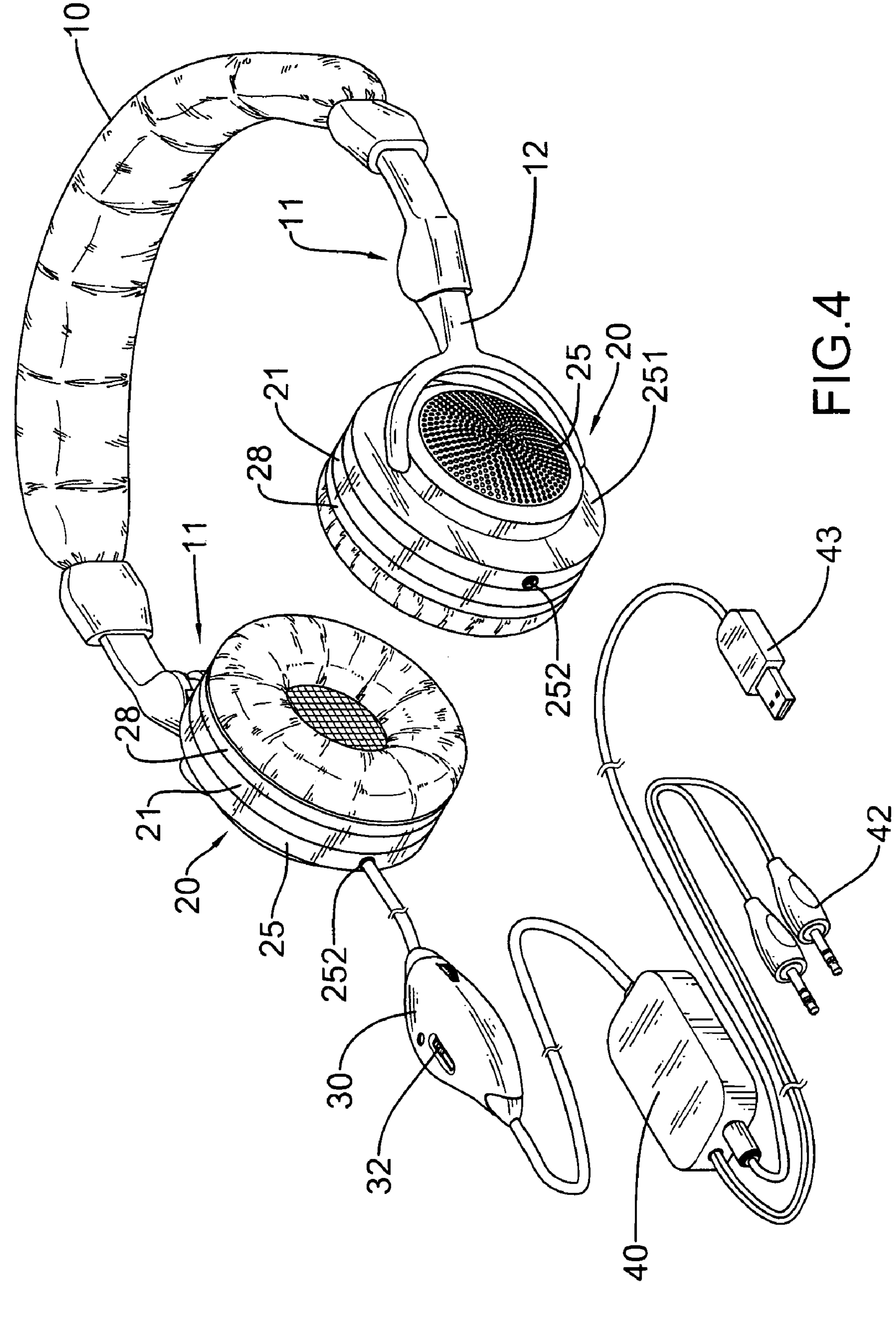
FIG. 4 is a perspective view of the multimedia speaker headphone in FIG. 2 with a universal serial bus (USB) cord.

With reference to FIG. 4, a second embodiment of the multimedia speaker headphone in accordance with the present invention is mostly the same as the first embodiment but the transmission apparatus (40) further has a universal serial bus (USB) cord (43) mounted detachably in the second socket (41).

Figure 5:
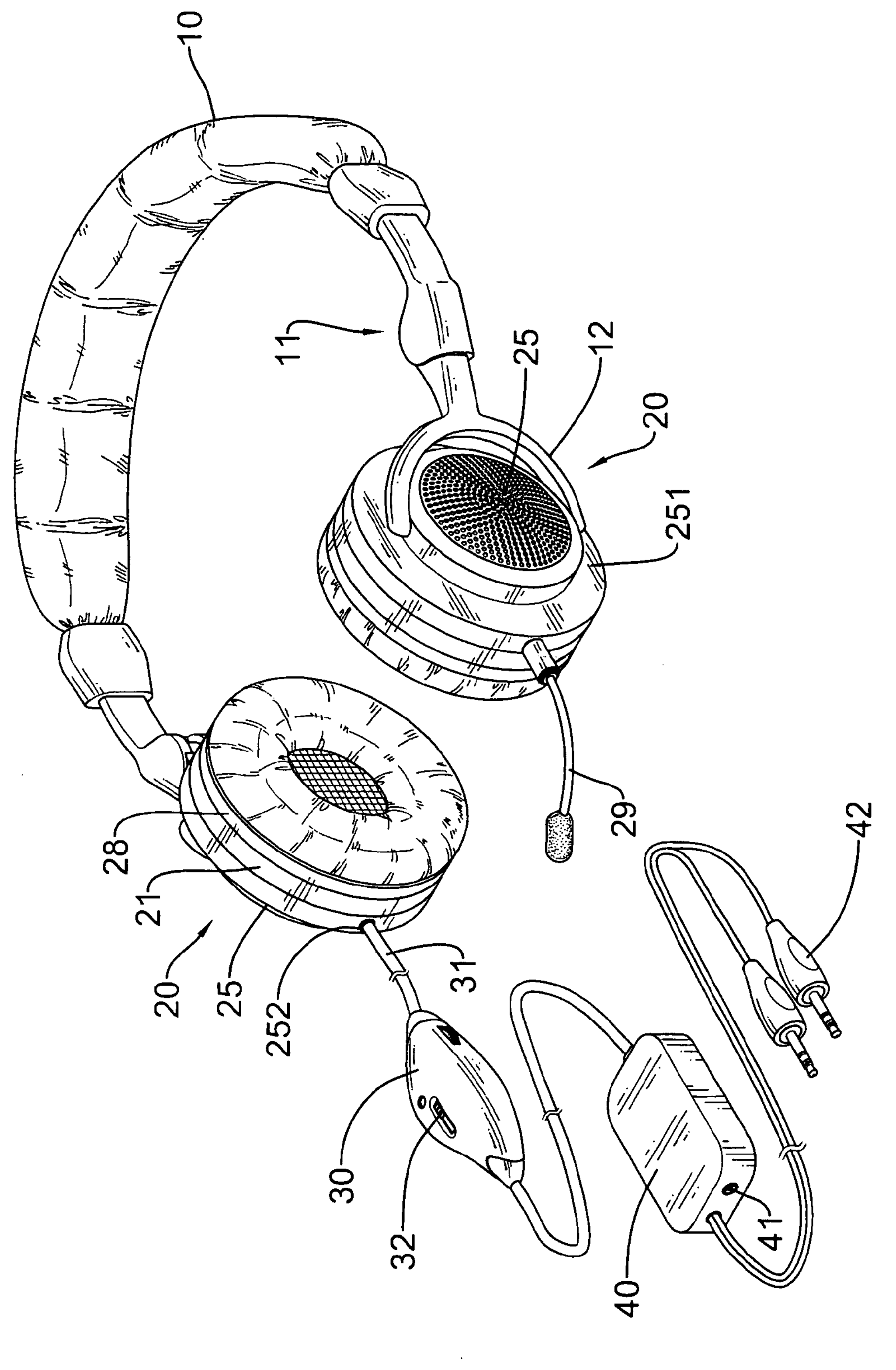
FIG. 5 is a perspective view of the multimedia speaker headphone in FIG. 2 with a microphone.

With reference to FIG. 5, a third embodiment of the multimedia speaker headphone in accordance with the present invention is mostly the same as the first embodiment but the ear-cover (20) without the controller (30) further has a microphone (29) mounted detachably in the first socket (251). The microphone (29) allows a user of the multimedia speaker headphone to input sound into the headphone and output the sound from the earphone speakers (27) or the audio speakers (25) so as the user's own sounds can be heard through the multimedia speaker headphone.

Figure 6:
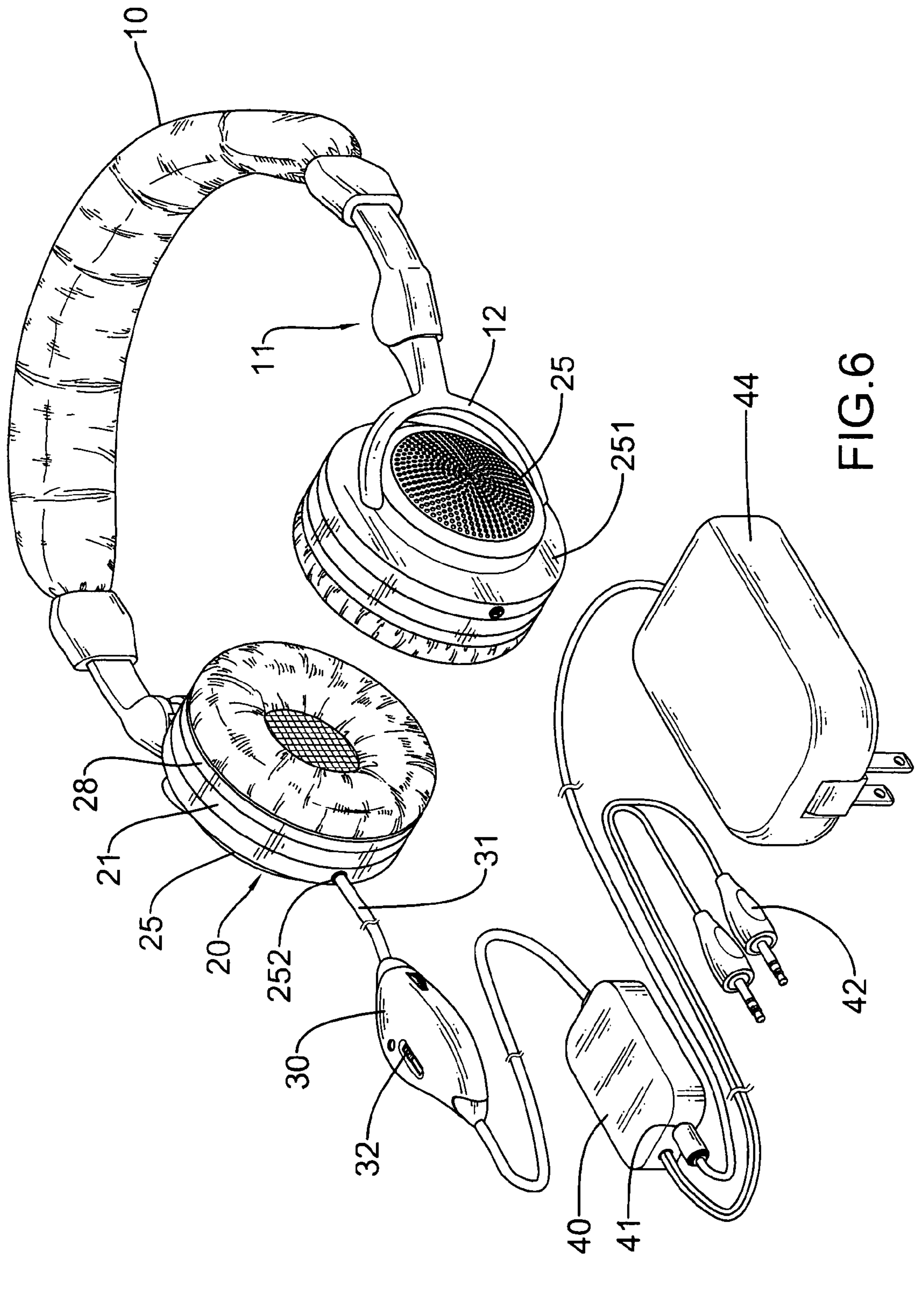
FIG. 6 is a perspective view of the multimedia speaker headphone in FIG. 2 with a power plug.

With reference to FIG. 6, a fourth embodiment of the multimedia speaker headphone in accordance with the present invention is mostly the same as the first embodiment, but the transmission apparatus (40) further has a power plug (44) mounted detachably in the second socket (41). When the power plug (44) is plugged into a power supply and the switch (32) moves to switch on the audio speakers (25), a third wire relative to the power plug (44) is connected electrically at a contact (K3) of the third wire so the audio speakers (25) operate with an external power. The third wire is connected to the power amplifying circuit.

The multimedia speaker headphone is used with an audio system such as an MPEG audio layer 3 (MP3) player with the terminal (42) of the at least one transmission cord plugged into a socket of the MP3 player. The switch selectively enables the user to switch on the earphone speakers (27) or the audio speakers (25). Alternatively, the multimedia speaker headphone is used with a computer or a recorder and the microphone (29) allows a wearer to input sound into the computer or the recorder.

The multimedia speaker headphone has the earphone speakers (27) and audio speakers (25) so a user can select the audio speakers (25) to listen to music or broadcast without wearing the multimedia speaker headphone. Furthermore, the arrangement of the multimedia speaker headphone can be changed to be especially compact for storage.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A multimedia speaker headphone comprising:
- a headband having
  - two joint ends; and
  - two cover mounts fitted pivotally and respectively at the joint ends and each cover mount having two ends;
- two ear-covers mounted pivotally and respectively between the ends of the cover mounts of the headband and connected electrically to each other, and each ear-cover having
  - a casing being annular and hollow and having
    - an inside open end;
    - an outside open end; and
    - an inner surface;
  - an audio speaker mounted on the outside open end of the casing and having
    - a housing; and
    - a first socket defined in the housing;
  - a retainer mounted on the inner surface of the casing;
  - an earphone speaker mounted on the retainer in the casing; and
  - a cover mounted on the inside open end of the casing opposite to the audio speaker and having an inside surface; and
- a control and transmission device connected electrically to one of the ear-covers and having
  - a controller connected electrically to one of the ear-covers and having
    - a cord mounted on the controller and having a connecting end detachably mounted in the first socket of the audio speaker of the connected ear-covers; and
    - a switch mounted movably on the controller, connected electrically to the earphone speakers and the audio speakers, selectively switching on the earphone speakers or the audio speakers, and the switch selectively moving to electrically connect a pair of first wires relative to the earphone speakers to switch on the earphone speakers or moving to electrically connect a pair of second wires relative to the audio speakers to switch on the audio speakers, and the second wires connecting a power amplifying circuit to the audio speakers; and
  - a transmission apparatus connected electrically to the controller and having
    - at least one transmission cord mounted to the transmission apparatus and having a distal end and a terminal mounted on the distal end; and
    - a second socket defined in the transmission apparatus.

2. The multimedia speaker headphone as claimed in claim 1, wherein the transmission apparatus further has a universal serial bus (USB) cord mounted detachably in the second socket.

3. The multimedia speaker headphone as claimed in claim 1, wherein the transmission apparatus further has a power plug mounted detachably in the second socket and a third wire relative to the power plug is connected to the power amplifying circuit.

4. The multimedia speaker headphone as claimed in claim 1, wherein the ear-cover without the controller further has a microphone mounted detachably in the first socket.

5. The multimedia speaker headphone as claimed in claim 2, wherein the ear-cover without the controller further has a microphone mounted detachably in the first socket.

6. The multimedia speaker headphone as claimed in claim 3, wherein the ear-cover without the controller further has a microphone mounted detachably in the first socket.

7. The multimedia speaker headphone as claimed in claim 1, wherein each cover has a soft pad mounted on the inside surface of the cover.

* * * * *